Patented Dec. 31, 1940

2,226,787

UNITED STATES PATENT OFFICE 2,226,787

GASOLINE ANTIOXIDANT

John W. Teter, Chicago, Ill., assignor to Sinclair Refining Company, New York, N. Y., a corporation of Maine No Drawing. Application July 14, 1937, Serial No. 153,559

12 Claims. (Cl. 44—9)

This invention relates to antioxidants for gasoline and more particularly to the preparation and use of certain compounds for inhibiting the oxidation of gasolines. In its more specific aspect, the invention relates to the preparation of halogenated cyclic alcohols which have antioxidant properties in cracked and polymer gasolines and to the use of these alcohols in such gasolines.

Cracked gasolines and particularly polymer gasolines contain substantial quantities of unsaturated compounds such as olefins. It is well known that unsaturated compounds have a tendency to oxidize when the gasoline containing them is allowed to stand for an appreciable length of time after its production. There are two salient disadvantages which characterize the oxidation or deterioration of cracked and polymer gasolines originally containing substantial amounts of unsaturated compounds. Firstly, gum-like products are formed upon oxidation of these unsaturated compounds. Such solid products may be formed while the gasoline is in storage tanks with the result that the gasoline has a cloudy appearance due to the precipitation of this solid matter. The gum-like product, together with additional solid matter formed in the gasoline tank of an automobile, for example, tends to settle out in the gasoline lines and carburetor of the automobile engine. Secondly, the presence of the unsaturated compounds in the gasoline imparts to the gasoline a high anti-knock rating which is higher in gasolines containing the larger quantity of these unsaturated compounds. However, when these unsaturated compounds are destroyed by oxidation the anti-knock characteristic of the gasoline is seriously lowered.

For these two well recognized reasons there have been incorporated in cracked and polymer gasolines substances which have the property of effectively inhibiting the oxidation of unsaturated compounds in the gasoline. Besides having this requisite inhibitory effect is is also desirable that the gasoline antioxidants be substantially insoluble in water and highly soluble in the gasoline so that there will be no tendency for the antioxidant to be dissolved out of the gasoline during storage by any moisture in the gasoline.

I have found that halogenated cyclic alcohols meet the several requirements of a highly desirable gasoline antioxidant. These cyclic alcohols have a powerful inhibitory action with respect to oxidation of unsaturated compounds and, furthermore, have a low water solubility with ready solubility in gasoline.

I have found that these halogenated cyclic alcohols may be readily prepared from inexpensive raw material such as phenol and coal-tar acids comprising cresols, xylenols, and the like. These phenols may be hydrogenated to produce the corresponding cyclic alcohol which, in turn, may be halogenated. The ring structure of the phenols may be completely hydrogenated by subjecting the phenol to the action of hydrogen at a suitable temperature in the presence of a catalyst such, for example, as nickel. The direct halogenation of the cyclic alcohol thus produced may be effected by subjecting the cyclic alcohol to the action of a halogen in the presence of a halogen catalyst carrier under suitable temperature conditions. Iron or iodine may be used with advantage as the halogen catalyst carrier.

I have found that the products obtained by direct halogenation of cyclic alcohols prepared from substituted phenols such, for example, as cresols, xylenols, and the like are particularly efficacious as gasoline antioxidants.

The saturated cyclic alcohol may be readily prepared in the following manner. o-Cresol is subjected to the action of hydogen in the presence of nickel in a suitable pressure chamber. By heating the mixture to a temperature between approximately 392 to 428° F. under a pressure of about 15 atmospheres, there is obtained a product containing o-methyl-cyclohexanol. The crude hydrogenation product is then purified by washing with a dilute caustic solution to remove any unreacted cresol. A pure o-methyl-cyclohexanol product having a boiling point of about 336° F. may be readily obtained by fractional distillation of the purified hydrogenation product.

The direct halogenation of the saturated cyclic alcohol will be more readily understood by consideration of the following examples in which a cyclic alcohol, namely, o-methyl-cyclohexanol, is chlorinated.

Example I o-Methyl-cyclohexanol is placed in a suitable chamber provided with means for introducing and withdrawing gaseous chlorine and preferably with means for agitating the contents of the chamber. Chlorine gas is then passed through the cyclic alcohol with thorough agitation at a temperature of about 70° F. in the presence of iodine crystals as a catalyst. The exothermic nature of the chlorination reaction tends to raise the temperature within the reaction chamber to the neighborhood of about 120° F. by the end of the reaction period. As the temperature of the reaction chamber increases, the rate at which the chlorine is passed through the cyclic alcohol is preferably decreased. After chlorine has been passed through the alcohol for about two hours, the chlorination may be discontinued. The resulting product contains about 70% of the total theoretical chlorination which is possible on the basis of the production of mono-chloro-mono-methyl-cyclohexanol. The product is then thoroughly washed with a dilute caustic solution and finally washed with water. The product is preferably dried with anhydrous calcium sulphate or an equivalent substance which is capable of removing water from the chlorinated cyclic alcohol. Upon fractional distillation of the resulting product and separation of the fraction removed between 372 and 430° F., a stable product is obtained which contains 26.02% chlorine. Inasmuch as mono-chloro-mono-methyl-cyclohexanol theoretically contains 23.6% chlorine and the di-chloro-mono-methyl-cyclohexanol theoretically contains 38.4% chlorine, it is apparent that the final product separated by fractional distillation between the temperatures of 372 to 430° F. comprises about 84% of the mono-chloro derivative and about 16% of the di-chloro derivative.

*Example II*

Pure o-methyl-cyclohexanol is chlorinated as described in Example I. Chlorination is stopped after 25.4% of the alcohol has been chlorinated calculated on the basis of the production solely of the mono-chloro derivative. Upon subsequent atmospheric distillation and separation of the fraction taken off between 332 and 370° F., a product is obtained which contains 90.7% mono-chloro-mono-methyl-cyclohexanol. The fraction distilled off between 420 and 424° F. comprises 88.5% di-chloro-mono-methyl-cyclohexanol. Of the two derivatives produced during the chlorination operation, 10% of the final product removed by distillation comprises the di-chloro derivative.

It is apparent from the foregoing examples that when o-methyl-cyclohexanol is chlorinated under the foregoing conditions, mono-chloro and di-chloro-mono-methyl-cyclohexanol are produced in the proportion of approximately 80 to 90% of the mono-chloro derivative and 20 to 10% of the di-chloro derivative. Thus, o-methyl-cyclohexanol may be chlorinated substantially only in the ring by carrying out the chlorination in the presence of a halogen carrier such, for example, as iodine at a temperature between 70 to 120° F. in the absence of sunlight. As the temperature of the reaction is increased, larger percentages of the di-chloro derivative are produced with respect to the amount of mono-chloro derivative formed.

For the purpose merely of illustrating the oxidation inhibitory effect of the antioxidants of my invention, the following table contains a comparison of the antioxidant efficiency of mono-chloro-mono-methyl-cyclohexanol and di-chloro-mono-methyl-cyclohexanol with o-cresol from which the chlorinated cyclic alcohols are prepared and also with o-methyl-cyclohexanol from which the final chlorinated product is obtained.

| Inhibitor | Percent by wt. | Percent efficiency | Percent purity | Percent eff. pure comp. |
|---|---|---|---|---|
| o-Cresol | .01 | 30 | 100 | 30 |
| o-CH$_3$cyclohexanol | .01 | 10 | 100 | 10 |
| Cl-o-CH$_3$ cyclohexanol | .0134 | 29.2 | 82.1 | 37.8 |
| di-Cl-o-CH$_3$cyclohexanol | .0141 | 82.6 | 81.7 | 109.0 |

The efficiency of the various antioxidants in the foregoing table was determined by oxygen bomb tests on a cracked distillate as the standard gasoline. The oxygen bomb test in each case was carried out by placing a 200 c. c. sample of the gasoline to be tested in a suitable container and then placing the container in a pressure bomb. After sweeping the atmosphere within the sealed bomb with oxygen, the bomb was filled with oxygen at a pressure of 100 lbs. per square inch. The bomb was then placed in a steam bath and heated to 212° F. and was maintained at this temperature throughout the test period. The maximum pressure within the bomb was recorded when the temperature thereof reached 212° F. The end of the induction period, that is the point at which the gasoline begins to oxidize, is indicated by a sharp and continued drop in the oxygen pressure within the bomb. By noting the time at which this maximum pressure was obtained, and the time at which the first appreciable drop in pressure occurred while the contents of the bomb were maintained at 212° F., an induction period was observed which is a direct measure of the relative tendency of the various gasoline samples to oxidize. The efficiency of the antioxidant compound was obtained by dividing the increase in the induction period of the gasoline containing the antioxidant compound over the induction period of the untreated gasoline by the induction period of the untreated gasoline.

From the foregoing table it will be readily apparent that 0.0134% by weight of a mono-chloro-mono-methyl-cyclohexanol product containing 82.1% of the pure chlorinated cyclohexanol in a cracked gasoline has an antioxidant efficiency substantially equal to that of 0.01% by weight of o-cresol and about three times as great as 0.01% by weight of o-methyl-cyclohexanol. The efficiency of the same quantity of the pure mono-chloro derivative having a boiling point of about 370° F. in the cracked gasoline, however, is substantially greater than the antioxidant efficiency of 0.01% by weight of pure o-cresol added to the gasoline. 0.0141% by weight of the di-chloro derivative product containing 81.7% of the pure derivative in the cracked gasoline has an antioxidant efficiency nearly three times that of 0.01% by weight of pure o-cresol while the efficiency of the same quantity of the pure di-chloro-mono-methyl-cyclohexanol having a boiling point of about 424° F. is at least 3.6 times that of 0.01% by weight of pure o-cresol added to the gasoline.

The quantities of the novel antioxidants of my invention which may be used with advantage, should not be limited to the quantities in the foregoing illustrations. The optimum amount in each case will vary with characteristics of the gasoline to be treated and will be readily ascertainable by simple tests on the gasoline by one skilled in the art.

Although the halogenated cyclic alcohols have been used alone in the foregoing examples of their antioxidant efficiencies, a mixture containing more than one halogenated cyclic alcohol may be used with advantage. Such mixture may contain, for example, the mono-chloro and di-chloro derivatives of a single cyclic alcohol or the mono-chloro or di-chloro derivatives of several different cyclic alcohols.

While the halogenated cyclohexanols in the foregoing examples have been prepared from o-cresol, it must be noted that the general method of preparing the halogenated cyclic alcohol is applicable to the products obtained by production of the cyclic alcohols from other phenols such as xylenols and phenols having substituted ethyl, propyl, etc., groups. Halogenated substituted saturated cyclic alcohols other than the chlorinated alcohols may be used with advantage. The fluorine substituted alcohols are generally more stable than the chlorinated alcohols while the bromine derivatives are generally less stable than the chlorinated alcohols.

I claim:

1. The method of inhibiting the oxidation of gasoline which comprises incorporating in the gasoline a small proportion of a halogenated saturated cyclic alcohol.

2. The method of inhibiting the oxidation of gasoline which comprises incorporating in the gasoline a small proportion of a chlorinated saturated cyclic alcohol.

3. The method of inhibiting the oxidation of gasoline which comprises incorporating in the gasoline a small proportion of a chlorinated cyclohexanol.

4. The method of inhibiting the oxidation of gasoline which comprises incorporating in the gasoline a small proportion of a chlorinated substituted saturated cyclic alcohol.

5. The method of inhibiting the oxidation of gasoline which comprises incorporating in the gasoline a small proportion of mono-chloro-mono-methyl-cyclohexanol.

6. The method of inhibiting the oxidation of gasoline which comprises incorporating in the gasoline a small proportion of di-chloro-mono-methyl-cyclohexanol.

7. The method of inhibiting the oxidation of gasoline which comprises incorporating in the gasoline about 0.01 per cent mono-chloro-mono-methyl-cyclohexanol by weight.

8. The method of inhibiting the oxidation of gasoline which comprises incorporating in the gasoline about 0.01 per cent di-chloro-mono-methyl-cyclohexanol by weight.

9. An improved motor fuel which comprises gasoline containing a small proportion of a halogenated saturated cyclic alcohol.

10. An improved motor fuel which comprises gasoline containing a small proportion of a chlorinated saturated substituted cyclohexanol.

11. An oxidation inhibitor for gasoline which comprises $Cl$-o-$CH_3$ cyclohexanol.

12. An oxidation inhibitor for gasolines which comprises di-$Cl$-o-$CH_3$ cyclohexanol.

JOHN W. TETER.